US007190371B2

(12) United States Patent
Palm et al.

(10) Patent No.: US 7,190,371 B2
(45) Date of Patent: Mar. 13, 2007

(54) 3D STEREO BROWSER FOR THE INTERNET

(76) Inventors: Charles S. Palm, 31324 Via Colinas, Suite 106, Westlake Village, CA (US) 91362; Brandie D. Lynn, 1438 W. Valerio St., Santa Barbara, CA (US) 93101

(*) Notice: Subject to any disclaimer, the term of this patent is extended or adjusted under 35 U.S.C. 154(b) by 0 days.

(21) Appl. No.: 10/839,314

(22) Filed: May 5, 2004

(65) Prior Publication Data
US 2004/0207639 A1 Oct. 21, 2004

Related U.S. Application Data

(62) Division of application No. 09/117,219, filed on Jan. 13, 1999, now Pat. No. 7,038,698.

(51) Int. Cl.
G06T 13/00 (2006.01)
G06T 15/70 (2006.01)
G06F 17/00 (2006.01)
G09G 5/00 (2006.01)

(52) U.S. Cl. ............... 345/582; 345/418; 345/552; 345/555

(58) Field of Classification Search ........ 345/418–422, 345/428, 581–583, 545, 549, 552, 555, 619
See application file for complete search history.

(56) References Cited

U.S. PATENT DOCUMENTS

| 4,600,919 | A | | 7/1986 | Stern ........................ 340/725 |
|---|---|---|---|---|
| 5,175,616 | A | | 12/1992 | Milgram ..................... 348/47 |
| 5,365,370 | A | | 11/1994 | Hudgins ..................... 359/464 |
| 5,369,736 | A | | 11/1994 | Kato et al. .................. 395/125 |
| 5,440,674 | A | | 8/1995 | Park .......................... 395/123 |
| 5,469,535 | A | | 11/1995 | Jarvis et al. ................ 395/130 |
| 5,490,240 | A | | 2/1996 | Foran et al. ................ 395/130 |
| 5,495,576 | A | | 2/1996 | Ritchey ...................... 395/125 |
| 5,504,845 | A | | 4/1996 | Vecchione .................. 395/119 |
| 5,555,366 | A | * | 9/1996 | Teig et al. ................... 711/169 |
| 5,566,285 | A | | 10/1996 | Okada ........................ 395/130 |
| 5,611,025 | A | | 3/1997 | Lorensen et al. ........... 395/119 |
| 5,617,322 | A | | 4/1997 | Yokota .................... 364/468.04 |
| 5,621,867 | A | | 4/1997 | Murata et al. .............. 395/125 |
| 5,748,199 | A | * | 5/1998 | Palm .......................... 345/473 |
| 5,805,205 | A | | 9/1998 | Songer ....................... 348/56 |
| 5,835,693 | A | | 11/1998 | Lynch et al. ............... 345/473 |
| 5,986,662 | A | | 11/1999 | Argiro et al. ............... 345/424 |
| 5,988,862 | A | | 11/1999 | Kacyra et al. .............. 703/6 |
| 6,023,277 | A | | 2/2000 | Osaka et al. ............... 345/419 |
| 6,026,215 | A | | 2/2000 | Fantone et al. ............. 358/1.2 |
| 6,084,594 | A | | 7/2000 | Goto .......................... 345/427 |
| 6,108,005 | A | | 8/2000 | Starks ........................ 345/419 |
| 6,313,836 | B1 | | 11/2001 | Russell et al. ............. 345/419 |

* cited by examiner

*Primary Examiner*—Wesner Sajous
(74) *Attorney, Agent, or Firm*—Allen, Dyer, Doppelt, Milbrath & Gilchrist, P.A.

(57) ABSTRACT

A viewer for viewing stereo images either downloaded over a network, such as the Internet, or resident on a personal computer uses a graphical user interface (GUI) to facilitate the display of wireframes with or without texture applied in a variety of formats. In stereo mode, the GUI permits adjustment of the neutral plane and of camera offset. The file sizes utilized with the viewer are very small and permit rapid transmission over a network. The files contain wireframe information, texture map information and animation information.

6 Claims, 25 Drawing Sheets

3D STEREO BROWSER FOR THE INTERNET

CROSS REFERENCE TO RELATED APPLICATIONS

This is a divisional of application Ser. No. 09/117,219, filed Jan. 13, 1999, now U.S. Pat. No. 7,038,698 by Charles Palm and Brandie Lynn, the priority date of which is claimed under U.S.C. § 120.

This application claims priority of U.S. Application Ser. No. 60/011,356 filed Feb. 8, 1996 which is hereby incorporated by reference in its entirely.

BACKGROUND OF THE INVENTION

When capturing and reproducing 3-dimensional images in the prior art, information from one camera of a stereo pair of cameras was depicted as one color (e.g. orange) or band of colors and information from the other camera of the pair was depicted in a complimentary color or color band. When viewing such images through 3-dimensional viewers, such as red/blue glasses, the reproduced image would not be perceived in color.

The orange elements in the picture are only seen through the blue lens, the red lens "washing out" the orange elements. For the same reason, the green-blue elements are only seen through the red lens. Hence, each eye sees only one of the two colored pictures. But because the different colored elements are horizontally shifted in varying amounts, the viewer's eyes must turn inward to properly view some elements, and turn outward to properly view others. Those elements for which the eyes turn inward, which is what the viewer does to observe a close object, are naturally perceived as close to the viewer. Elements for which the viewer's eyes turn outward are correspondingly perceived as distant. Specifically, if the blue lens covers the viewer's right eye, as is generally conventional, then any blue-green element shifted to the left of its corresponding orange element appears to the viewer as close. The element appears closer the greater the leftward shift. Conversely, as a green-blue element is shifted only slightly leftward, not at all, or even to the right of its corresponding red element, that element will appear increasingly more distant from the viewer.

When 3-dimensional images are captured, corresponding points of the left image are displaced from the same points in the right image horizontally. A measurement of the amount of displacement is called "disparity". In the prior art when stereo images are made, the disparity for all subject matter visible in both images is fixed. In digital images, disparity can be measured in terms of the number of pixels a point on a left image is displayed from the corresponding point in the right image. Fixed focal length lenses are customarily used for the cameras In an object with zero disparity, the corresponding pixels for the left and right images are perfectly superimposed and the object appears to be located on the screen. Zero disparity objects are seen most clearly when the eyes are crossed just enough to focus on the plane of the screen. Negative disparity objects appear to come out of screen toward the viewer and are seen most clearly when the eyes are more crossed. Positive disparity objects appear to be more distant than the screen and are seen most clearly when the eyes are less crossed.

The eyes cross or uncross in order to get similar image features on or near the fovea of each eye. The "farthest" object that can be seen in an anaglyph is limited by the observers ability to comfortably uncross the eyes. (The usual limit to distant viewing is set by the condition where the eyes look along parallel axes, as when looking at a very distant object such as a star in the night sky. When the eyes attempt to diverge beyond the parallel axes viewing limit, a "wall-eyed" condition exists that is rarely comfortable to the observer.)

Some stereo images cover such a great range of depth and will have such widely varying values (even without a "zoom-in") that some portions of the image will always be out of range of the observer's ability to see the stereo effects, regardless of how the anaglyph was formed.

Three dimensional techniques are closely related to the psychology and physiology of an observer's cognitive processes. Subtle changes in selection of portions of the spectrum presented to each eye can result in significant changes in the observer's perception. Even when viewing the same 3-dimensional image through the same viewers, different observers may perceive a 3-dimensional image in different ways.

The depth location of the point at which the left and right image points for objects at that distance coincided constitutes a "neutral plane" and when observing a fixed disparity 3-dimensional image, the neutral plane would be found at the surface of the medium of reproduction (i.e. paper or CRT display). Items that appear closer than the medium surface and those points in the image which appear behind the neutral plane would have different disparity. The loss of depth perception when disparity exceeds a certain value generally means that when zooming-in on part of a stereo image pair that disparity will become so great that depth perception will be lost.

In the prior art, there is no way to control an image so as to position it either in front of or behind a neutral plane in a controllable fashion. This limits the ability to create 3-dimensional animations.

In addition, both anaglyphs in stereoscopic optical arrangements are known which permit a user to view images in stereo either using red-blue glasses or separate optical channels for each eye.

Computer systems are also known which attempt to provide a sense of "virtual reality" by which a user perceives a computer generated environment as if the user were immersed in that environment. Typically, these systems permit a measure of interaction between the user and the computer simulated environment. To make the virtual reality environments appear realistic, it is preferable that a user see the environment in three dimensions or, in other words, in a stereo view.

The Problems

One of the serious problems of the prior art is the fact that three dimensional stereo presentations, whether static images or dynamic animations of some sort, typically require much more memory than an XY image that does not contain depth information or suffer from a loss of resolution in the vertical image direction to "line interlace" effects that are necessary to convey "half-image" information to the left eye and "half image" information to the right eye. The size of the files associated with a virtual reality presentation therefore constitute a substantial impediment to the use of those files across networks, especially relatively low speed networks such as the Internet. This is especially true for dynamic, animation presentations where even simple non-stereoscopic-viewing "flick" files (Autodesk *.FLC and

*.FLI files), audio-visual-interlace files (Microsoft *.AVI files) and Apple Quicktime VR files can easily occupy 5–100 Mbytes of file space.

It would thus be desirable to have a "small file" size (20–300 Bytes of file space) virtual reality system which would permit rapid file transfer across a relatively low speed network for interactive display with the user at the other end of the network connection.

Another problem with the prior art is that typically, even if the large files can be transferred, the processing required to render a surface texture on a three dimensional wire frame has been excessive. As a result, extremely high performance work stations have been required to do even relatively simple transactions involving virtual reality or stereoscopic presentations.

Further, the generation of wire frames and their subsequent texturing has been an extremely expensive, time consuming process. It would be desirable to be able to capture images, create wire frames and package them for presentation to a user in a rapid; efficient and cost effective manner.

SUMMARY OF THE INVENTION

The problems with the prior art are overcome in accordance with one aspect of the invention, by providing a three dimensional stereo viewer which is suitable for use with the Internet and with other relatively low speed networks.

In accordance with another aspect of the invention, both wire frame, texture map information and animation information are stored in a single file for use in the rapid creation and rendering of three dimension stereo images.

Another aspect of the invention lies in the very rapid capture and creation of wire frames from image data and their subsequent texturing using only relatively inexpensive and readily available personal computer systems.

The invention also relates to a computer having a processor, a memory, and a stereo viewer loaded in memory, said stereo viewer including a graphical user interface including a viewing window in which wireframes can be viewed with and without texture and a plurality of controls for manipulating a wireframe, a wireframe's texturing or a view of a wireframe.

The invention also relates to a computer system, having a network, at least one server connected to said network containing files of images to be presented in stereo, a computer, having a memory and a browser application, connected to said network, for retrieving one or more files of images to be presented in stereo, and a stereo viewer loaded in said memory, said stereo viewer including a graphical user interface including a viewing window in which wireframes can be viewed with and without texture and a plurality of controls for manipulating a wireframe, a wireframe's texturing or a view of a wireframe.

The invention is also directed to a method of storing wireframe information for presentation as a stereo image, by: storing x,y,z coordinates of vertices of a wireframe together with X'Y' coordinates specifying a corresponding location in a bit map containing texturing information.

The invention is also directed to a method of displaying wireframe information stored in a file, by extracting wireframe vertex information and a compressed bit map from said file, decompressing said compressed bitmap, and displaying a wireframe specified by said wireframe information, with texture taken from said bitmap. Animation information extracted from the file may also be used to control the display of the textured wireframe in a sequence of different positions and orientations.

The invention is also directed to a computer program product, including a memory medium, and a computer program stored on said memory medium, said computer program containing instructions for storing x,y,z coordinates of vertices of a wireframe together with u,v coordinates specifying a corresponding location in a bit map containing texturing information.

The invention is also directed to a computer program product, comprising: a memory medium, and a computer program stored on said memory medium, said computer program containing instructions for extracting wireframe vertex information and a compressed bit map from said file, decompressing said compressed bitmap, and displaying a wireframe specified by said wireframe information, with texture taken from said bitmap The invention is also directed to a computer program product, including a memory medium, and a computer controlling information stored on said memory medium, said computer controlling information including vertex location information for a plurality of vertices, a bit map of texture for faces of a wireframe and a set of u;v coordinates for each vertex pointing to a corresponding location on said bit map.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects all without departing from the invention. Accordingly, the drawings and description are to be regarded as illustrative in nature and not as restrictive.

BEST MODE FOR CARRYING OUT THE INVENTION

Figure 1:
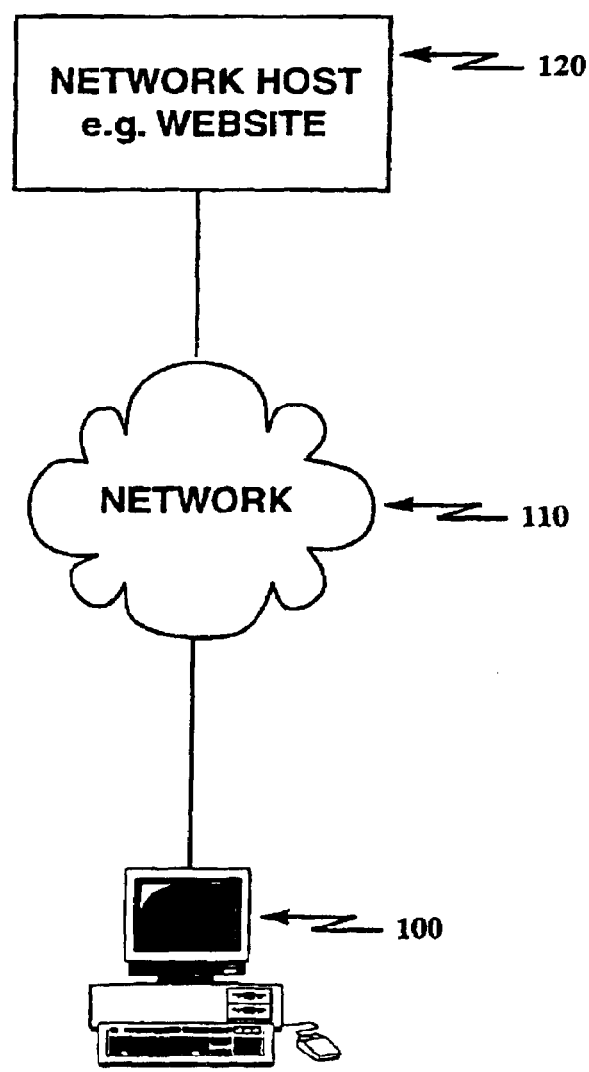
FIG. 1 is a block diagram of an exemplary computer and a server in accordance with the invention used to retrieve and display three dimensional stereo information across a relatively low speed network, such as the Internet.

FIG. 1 is a block diagram of an exemplary computer and a server in accordance with the invention used to retrieve and display three dimensional stereo information across a relatively low speed network such as the Internet. A computer terminal 100 is connected to the network 110. During the time that a user of computer 100 is connected to the network, the user may connect to a network host 120, such as a web site or other computer running a server process. Computers operating over a network often utilize a client server paradigm. A client process running on computer 100 may request that a network server such as 120 perform certain functionality. Generally, the service is requested in the form of a message and the results of that service, that is the information obtained in the processing requested, is returned from the server to the client (user terminal 100) over the network also in a message.

Figure 2:
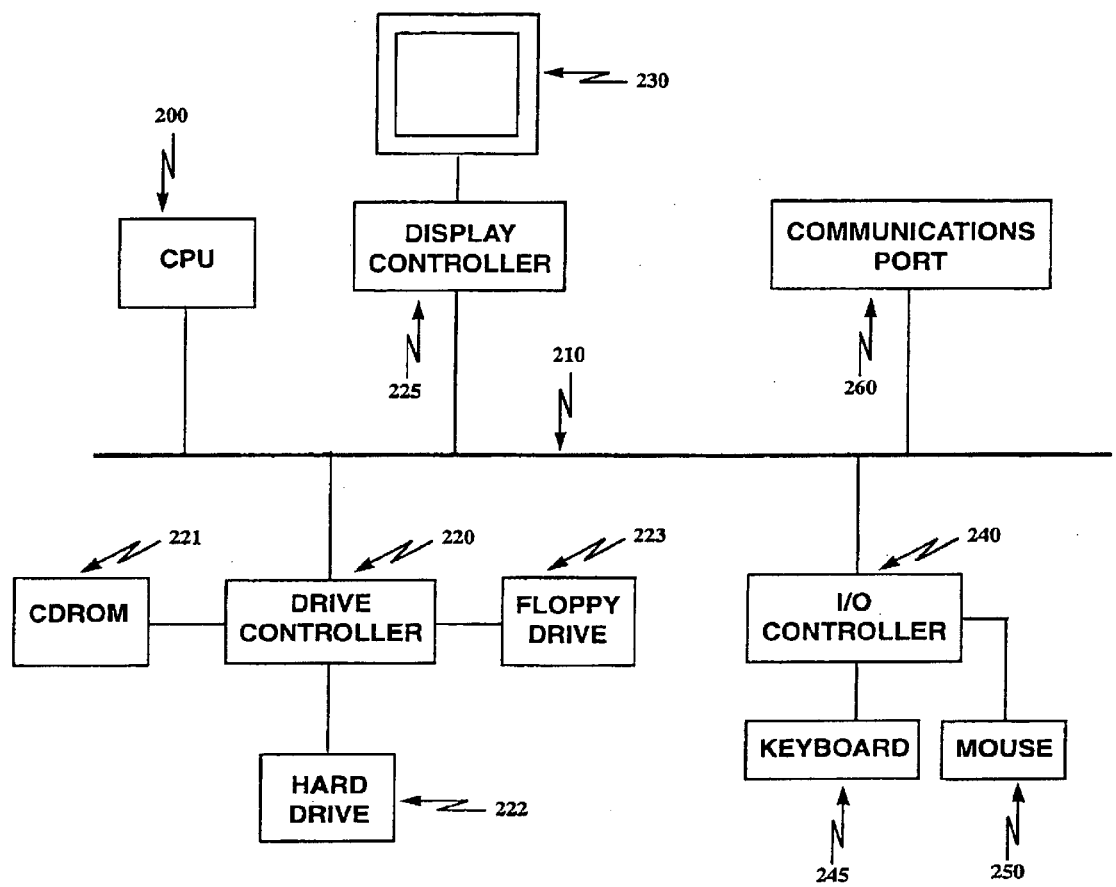
FIG. 2 is a block diagram of a computer architecture suitable for use in carrying out the invention.

FIG. 2 is a block diagram of a computer or architecture suitable for use in carrying out the invention.

A central processing unit (CPU) 200 is connected to bus 210. A drive controller 220 is also coupled to the bus 210 for controlling writing to and reading from a variety of drives. Theses drives may be a CDROM 221, a hard drive 222, a floppy drive 223 or some other device which can be modeled as a drive. Display controller 225 interfaces the computer display, such as a cathode ray tube or a semiconductor or liquid crystal display. An I/O controller 240 interfaces both the mouse 250 and the keyboard 245 and manages the gathering of information required to interact with the user during the use of the computer. Communications port 260 is also connected to bus 210 and serves to provide a link to a network, if a network connection is desired.

Figure 3:
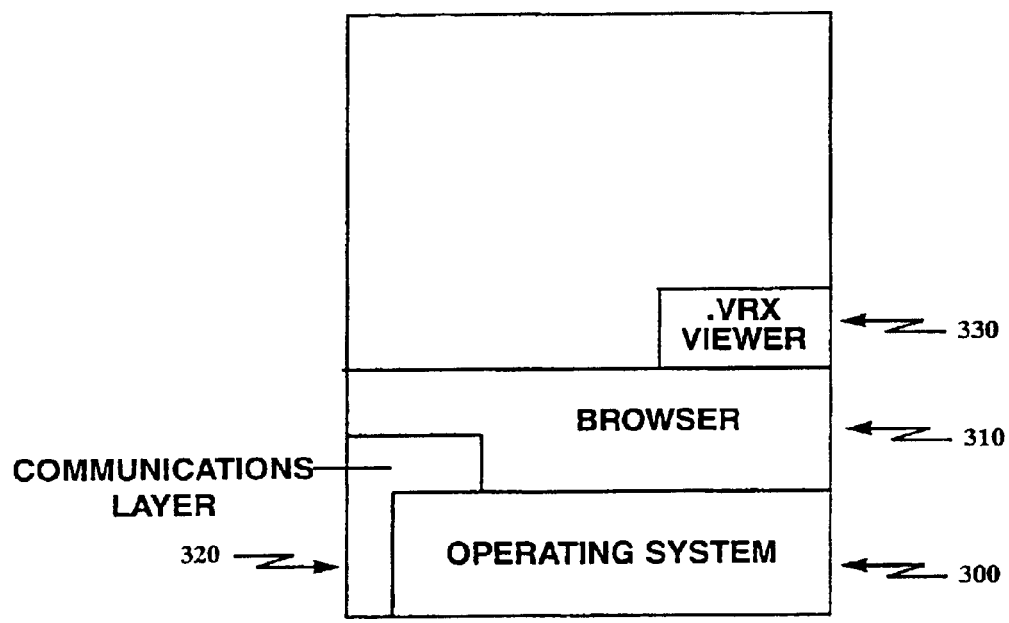
FIG. 3 is a diagram of an exemplary software architecture suitable for use with computer of FIG. 2 for running the stereo viewer of the invention in a network application.

FIG. 3 is an illustration of preferred software architecture for use with a computer of FIG. 2 for running the stereo viewer of the invention in a network application. This software is built up in layers reflecting their relative distance from the actual hardware being controlled. At the lowest layer, the operating system 300 is found. The operating system provides suite of services accessible to higher level applications for causing the computer to operate. Browser software 310 is loaded on top of the operating system. An important part of browser 310 is the existence of communication software which provides access to either a network or to external devices. The communications layer is shown as extended partially into the browser area and also as by-passing the operating system and going directly to the hardware. This is intended to reflect that communications software can be implemented in different ways. In one form, communications software utilizes the services of the operating system. In other systems, it may be desirable to completely by-pass the operating system's communications capabilities and to write a device driver which directly accesses the hardware, by-passing the operating system. Intermediate systems also occur in which only part of the needed functionality accesses the hardware directly and the remainder uses operating system services. A .vrx viewer 330 is shown resident on the computer. Typically, the .vrx viewer will be configured for a helper application to the browser software. Helper applications are well-known in the art and are easily implemented using traditional browser software.

The operating system is preferably the Windows 95 operating system from Microsoft. The browser 310 is preferably the Netscape browser from Netscape Communications Corporation. The .vrx viewer 330 is the subject of this application and is discussed more hereinafter.

Figure 4:
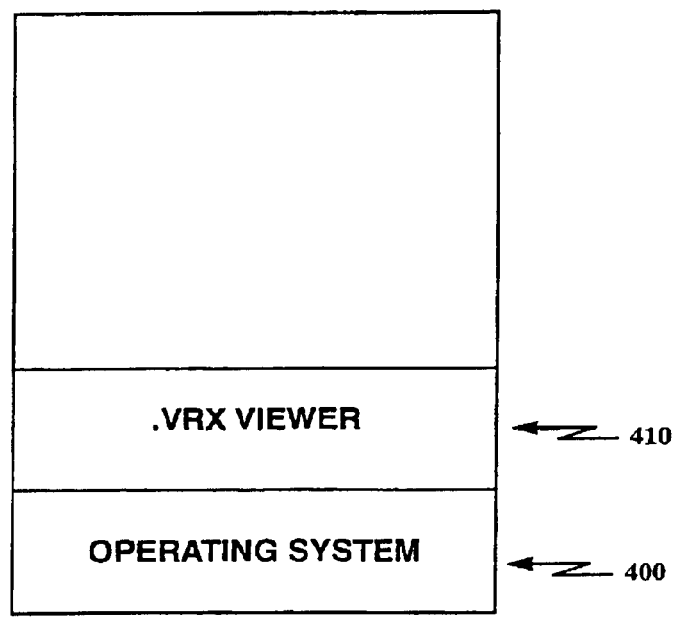
FIG. 4 is a diagram of an exemplary software architecture for use with computer of FIG. 2 for running the stereo viewer of the invention is a stand alone application.

FIG. 4 is an illustration of a software architecture for use with the computer of FIG. 2 for running the stereo viewer of the invention in a stand alone mode. The operating system 400, in a stand alone mode, provides all of the functionality required for the .vrx viewer 410 to function. Again, the operating system is preferably Windows 95.

Figure 5:
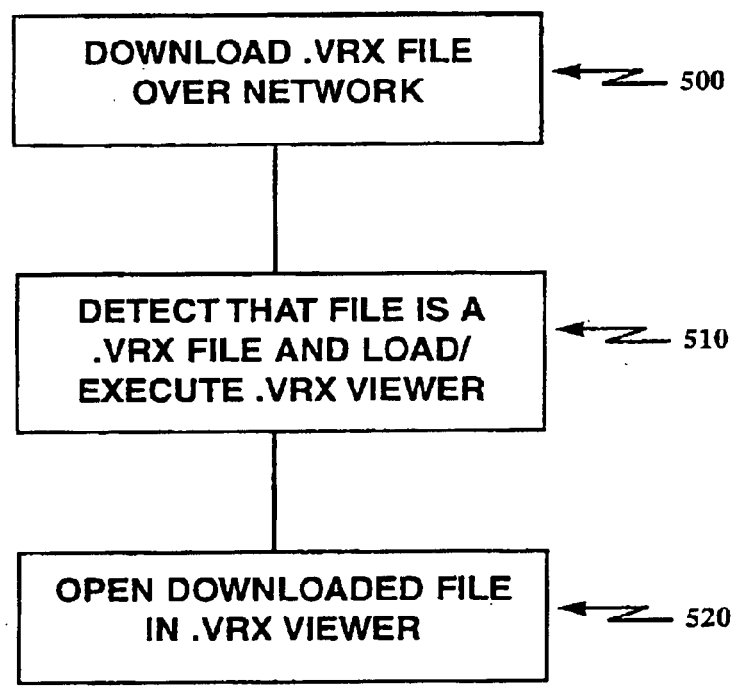
FIG. 5 is a flow chart of a process for downloading a 3D stereo file over a network and for displaying and viewing the file.

FIG. 5 is a flow chart of a process for downloading a 3D stereo file (.vrx file) over a network in accordance with the invention. First, the .vrx file is down loaded, e.g., from a web site or other location on a network, and is stored in the memory space of computer 100 (500). The computer 100 detects that file is a .vrx file and loads and executes the .vrx viewer resident on the computer 100 and then opens the down loaded .vrx file in the viewer for manipulation and display (520).

Figure 6:
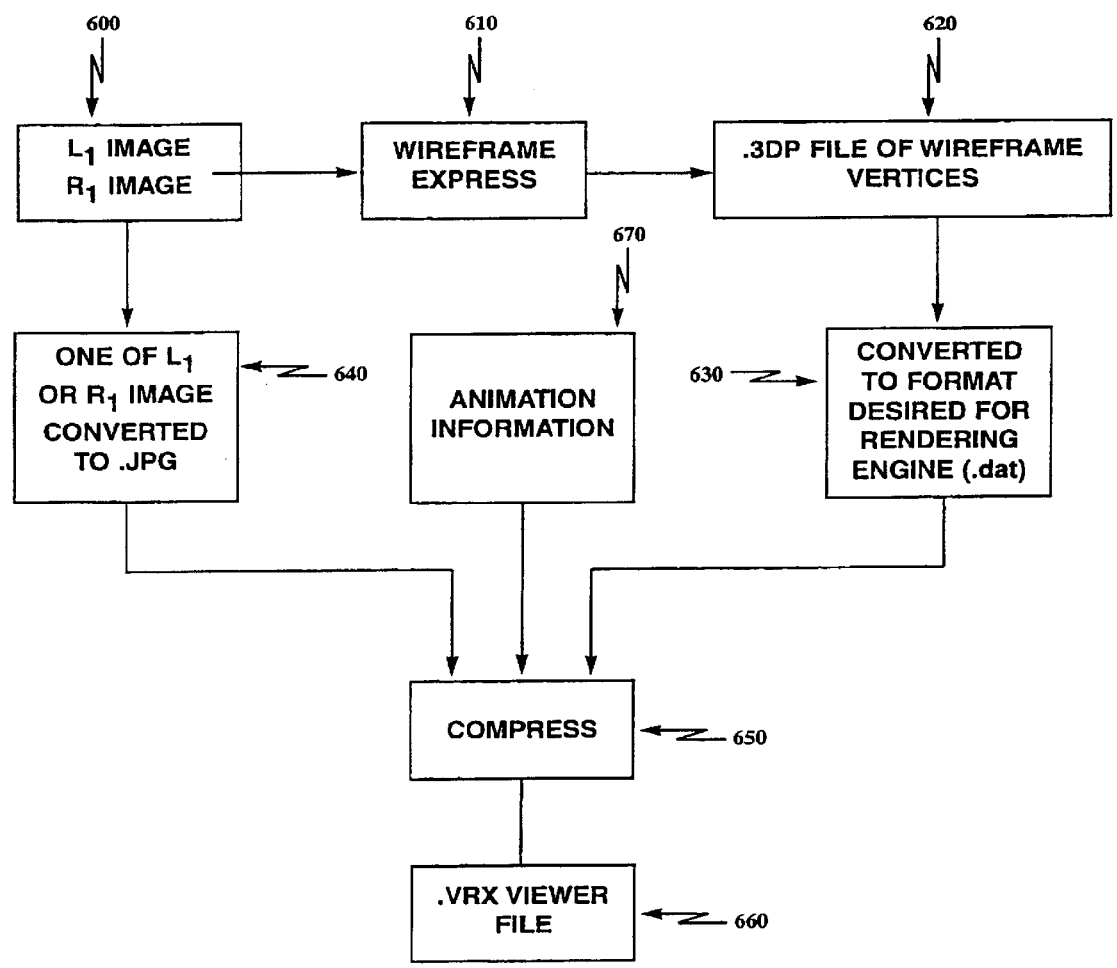
FIG. 6 is a flow chart of a process for creating a wire frame file containing vertex information, texturing information and animation information (.vrx file) in accordance with the invention.

FIG. 6 is a flow chart of a process for creating a wire frame file containing wireframe information, texturing information and animation information (.vrx file) in accordance with the invention. In a preferred mode of carrying out the invention, left and right images are captured of a scene to be rendered in a wire frame. The two images are then loaded into a software product "Wire Frame Express" (610) from Synthonics Technologies Incorporated. Corresponding points on the left and right images are identified and a wire frame automatically generated resulting in a 0.3DP file of wire frame vertices. In the 0.3DP file, the X, Y, and Z coordinates of each vertex are identified, and the U,V coordinates are generated identifying corresponding points on the texture map to be utilized. U,V coordinates are well-known in the art. They typically represent a relative position on the bit map expressed as a decimal fraction, whereas X' and Y' represent absolute addresses. However, the U,V coordinates for a particular X, Y, Z vertex represent the position of the X, Y, Z point on the bit map used to provide texturing. In the case illustrated in FIG. 6, the bit map used to provide texturing is one of the L1 or R1 images shown in block 600. Each vertex is associated with a particular face or surface element utilized for rendering texture on the wire frame representation.

The one of the L1 or R1 images to be utilized for providing texture is converted to a .jpg (JPEG—(Joint Motion Pictures Expert Group)) standard format and compressed at step 650. Compression algorithms other than JPEG may be used. They include Fractal compression, Wavelet compression, and many others. JPEG was selected because of the universal use by the PC community of graphical users. The 0.3DP file as output from the Wire Frame Express may require some conversion of format before being passed to the rendering engine for the application of texture to a wire frame (630). The file format utilized in this particular application, is a .dat file and is a format required by the preferred rendering engine. In the preferred embodiment, the rendering engine is BRender, version 1.1.2, produced by Argonaut Technologies Limited of Capitol House, Capitol Way, Colindale, London NW9 0DZ, United Kingdom. Alternative rendering engines can be "Reality Lab" 3D Application Programming Interface by RenderMorphics Ltd, 3DR and MMX technology by Intel and DirectX by Microsoft.

The .jpg texture map and the .dat wire frame representation from blocks 640 and 630, respectively, are compressed in block 650, the output of which forms the .vrx viewer file 660. The particular compression algorithm utilized is not important. What is important is that it is desired to have both the wire frame information from block 630 and the texture information from block 640 in a single file. This avoids having a fragmented downloading process and permits all information to be available for viewing at the viewer.

Note that there are relatively few products which will create wire frames from two digital images of the same scene. The Wire Frame Express product from Synthonics Technologies of Westlake Village, California, permits this to be done with great facility and with great economy of vertices. As a result, the resulting file sizes are considerably smaller than would otherwise be required.

Note also that when utilizing images for the creation of wire frames, it is often desirable to take pictures of a three-dimensional object at approximately every 30 degrees of solid angle so that wire frames created utilizing pairs of adjacent pictures can be pieced together into a wire frame covering 360 degrees of solid angle. This is not required, however, it is desirable when a large portion of a real object is to be modeled. When a model is piecewise constructed in the manner just described, the construction of the .vrx viewer file will include a plurality of segments, each segment constituting wire frame vertices converted in a manner suitable for the rendering engine together with bit map image information selected for use with that wire frame. Thus, a multi-segment project will have a plurality of files of wire frame vertices and respective bit mapped texture information which can be assembled into an entire textured model of the object.

Figure 7:
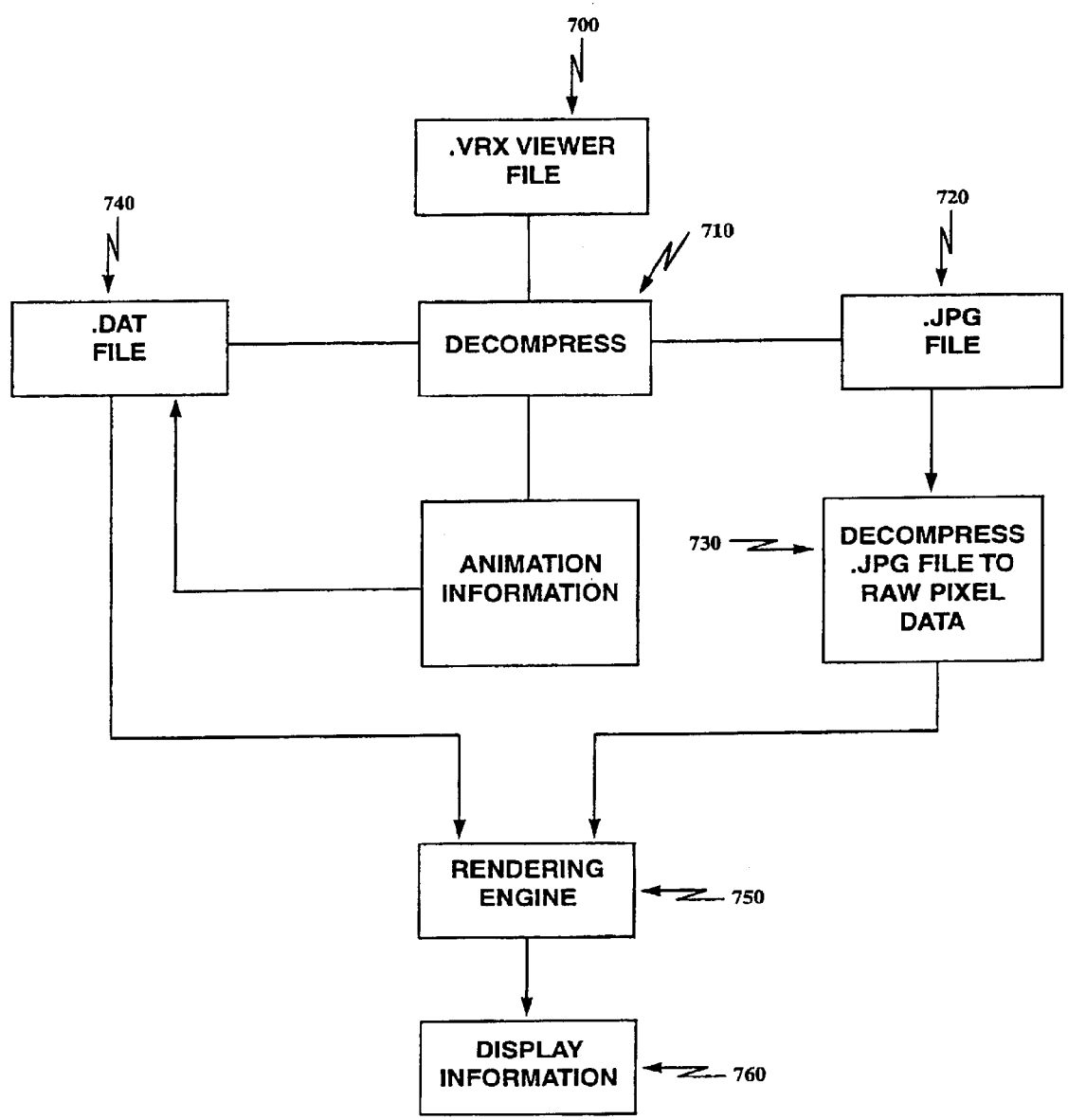
FIG. 7 is a flow chart of a process for creating a three dimensional stereo display and optional animation from a .vrx file.

FIG. 7 is a flow chart of a process for creating a 3D stereo display from a .vrx file. When a .vrx viewer file is opened using the viewer, as described more hereinafter, the compression applied to the components at step 650 is reversed a block 710 and the .dat file components separated from the .jpg file components (740 and 720 respectively). The .jpg file components are decompressed (730) down to raw pixel data. This is necessary because the .jpg encoding algorithm itself inherently compresses. The .dat file is passed to the rendering engine as well as the raw pixel data from block 730. Then rendering engine then displays the information in a viewing window for the user to view and manipulate (760). the animation information 770 affects the display of the wireframe by causing the position, orientation and view of the object to be sequentially changed in an animation sequence.

Figure 8:
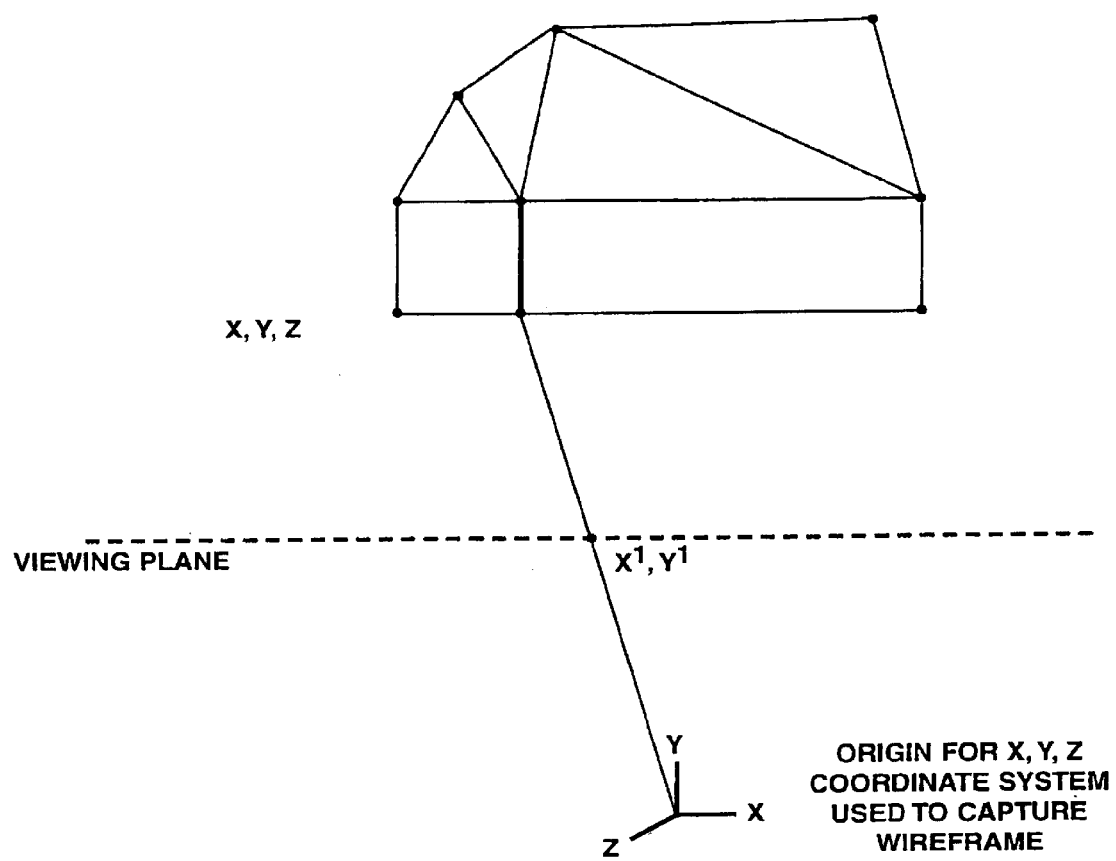
FIG. 8 is a representation of the wire frame defined in XYZ space as viewed on a screen in X'Y'.

FIG. 8 is a representation of a wire frame defined in XYZ space as it is viewed on a screen in X'Y'. Each vertex of the wire frame model has X, Y and Z coordinates associated with it. Those coordinates implicitly define an origin for the XYZ coordinate system and, in the case shown, that coordinate system utilized to capture the wire frame. Computer systems generally display only two dimensional information on a flat surface. Thus, the way a particular point from a three dimensional space is mapped on to a two dimensional screen essentially involves taking a ray projection from the point in three space and running to the viewing position, or, in this case, the origin for the X, Y, Z coordinate system and finding out where that line intersects a display screen. In short, the origin constitutes a point which serves as a perspective for viewing the wire frame model. Knowing where the wire frame map vertices are located and knowing where the origin of the coordinate system is, for an arbitrary viewing plane, between the two, the proper points to be utilized to represent the image in a two dimensional screen space are the points X'Y'. They are determined by calculating simply the intersection of a line between the origin and a particular X, Y, Z vertex and the plane upon which the object is displayed.

Although a particular coordinate system may be utilized to define a wire frame, when the wire frame so defined is moved to a different system, it will be viewed from a different perspective location, such as the origin of the L, M, N coordinate system. Thus, the projection of vertices, L, M, N on a plane between the vertex and the origin will define an L'M' intersection point. Note that the value of X, Y, Z can be related to the value of L, M and N by a simple generalized coordinate transformation.

Figure 9:
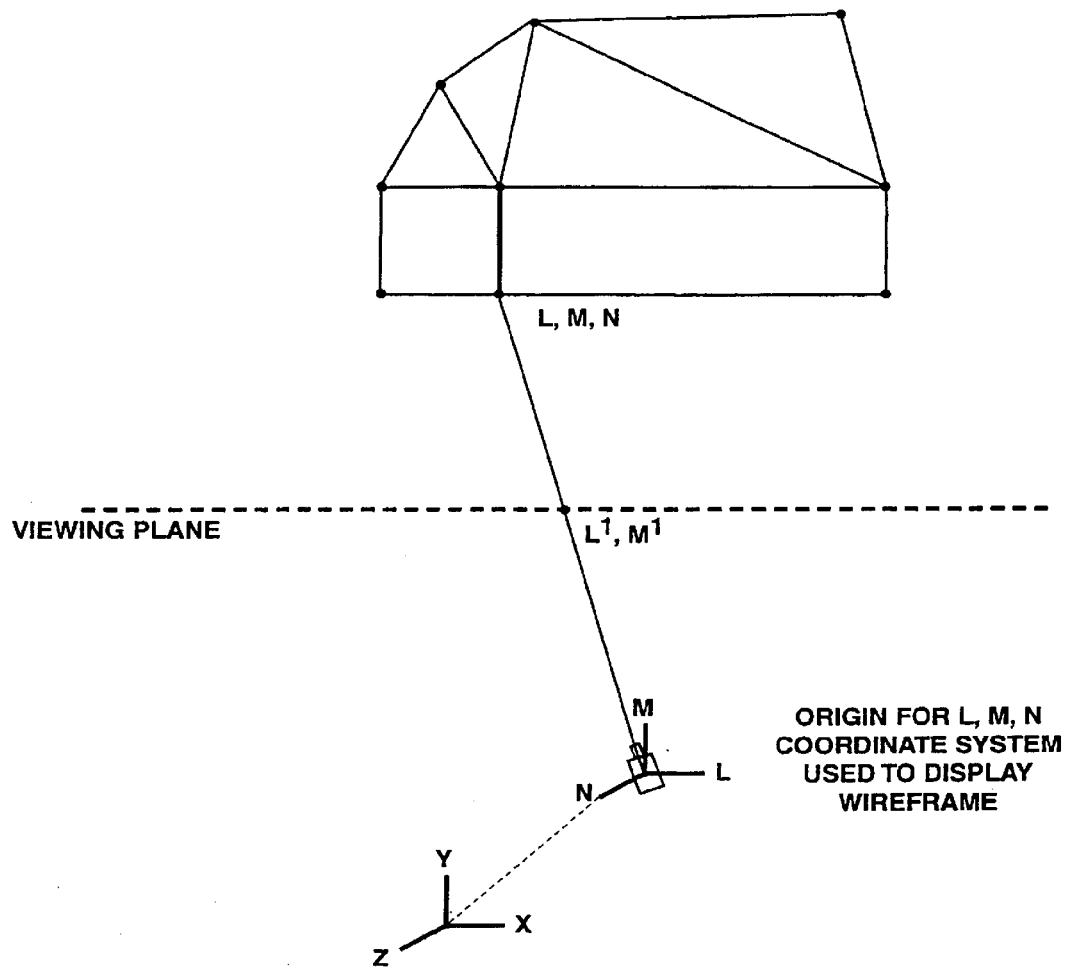
FIG. 9 is an illustration how a change of view can be implemented as a generalized coordinate transformation.
Figure 10:
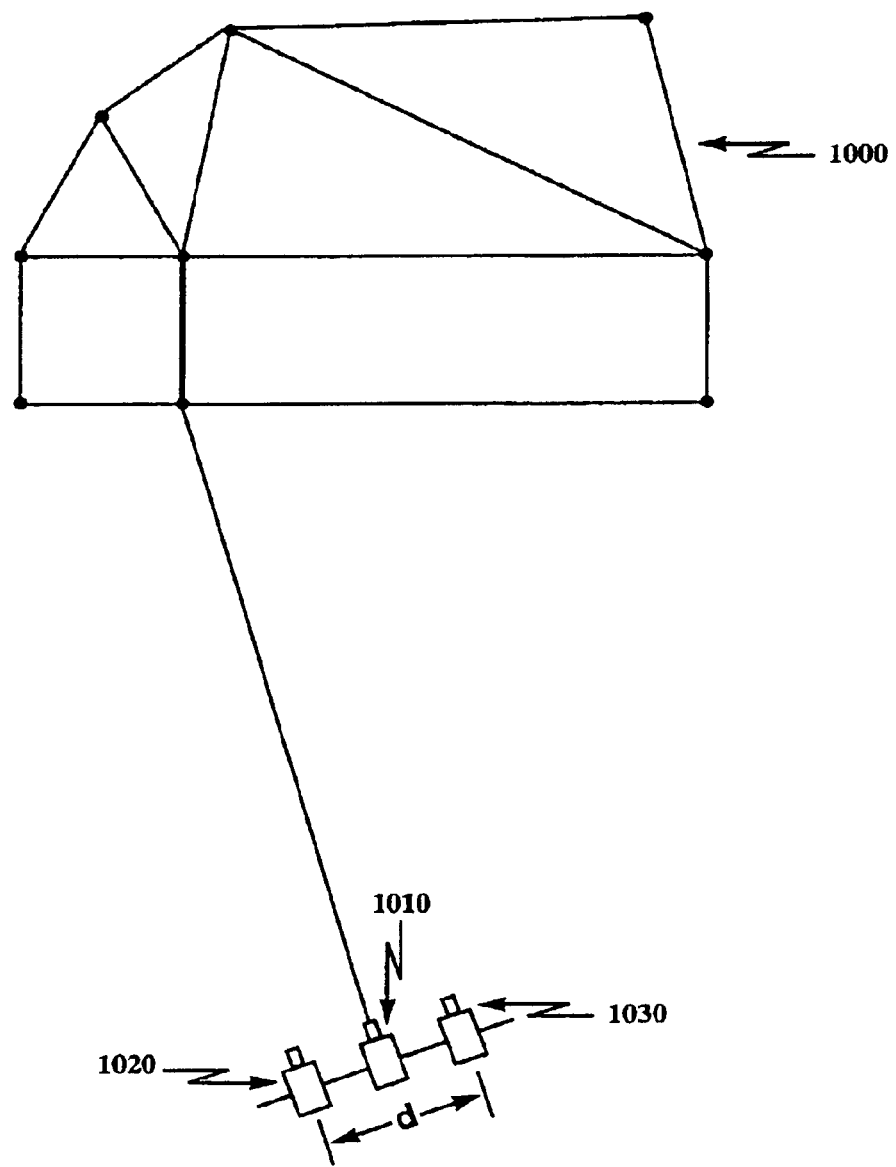
FIG. 10 is an illustration of camera positionings utilized in accordance with the invention.

FIG. 10 is an illustration if camera positioning utilized in accordance with the invention. When viewing a wire frame from a viewing origin, such as L, M, and N of FIG. 9, there are two modes utilized. In one mode, no stereo information is presented. When implementing the .vrx viewer in accordance with the invention, when stereo information is not utilized, the wire frame is viewed as if there were a camera point located at L, M, N (1110). When stereo information is to be utilized, instead of camera 1110, cameras 1120 and 1130 are utilized. These cameras are separated by camera offset D shown in FIG. 10. Left and right cameras capture respective views of the wire frame.

Figure 11:
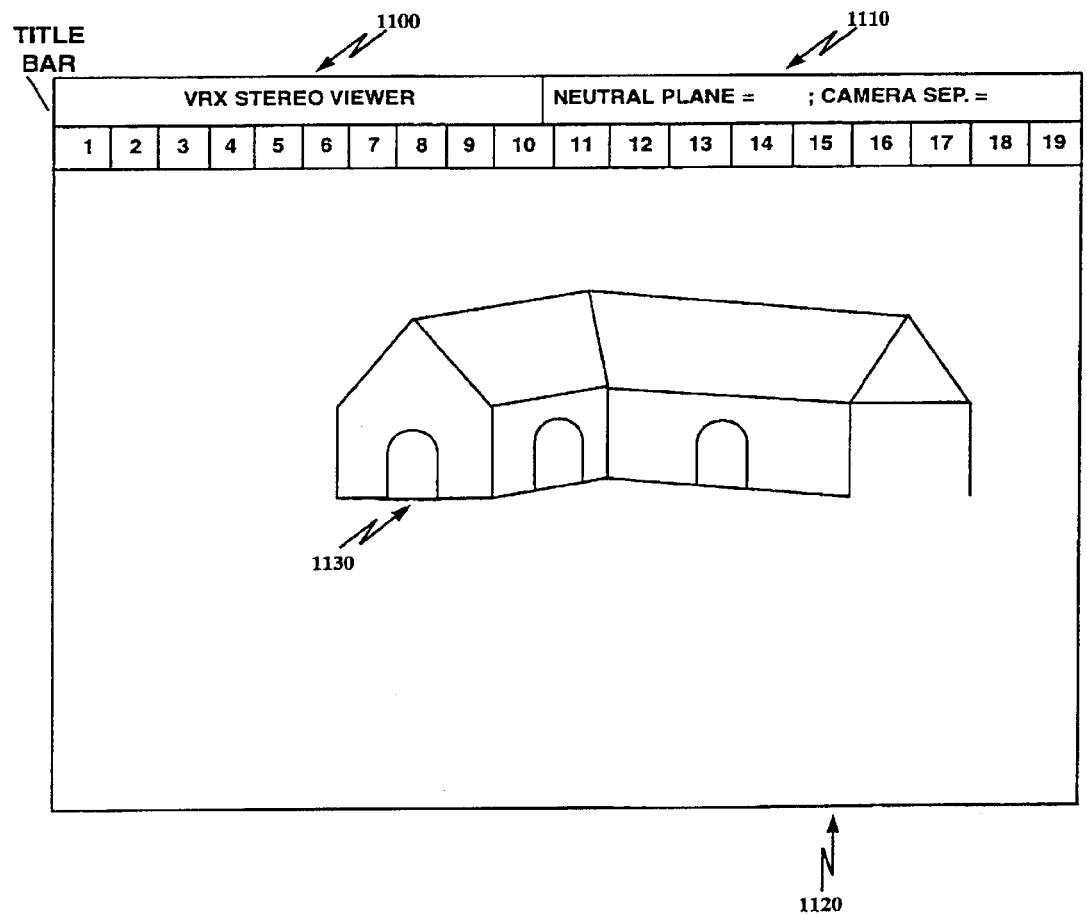
FIG. 11 is a representation of a Graphical User Interface (GUI) in accordance with the invention.

FIG. 11 is a representation of a graphical user interface in accordance with the invention. The graphical user interface comprises four main areas. The first is a title bar 1100 containing the title of the software being utilized. On the same line, in block 1110, information about the location of the neutral plane and camera separation is displayed. A viewing window 1120 permits the viewing of a three dimensional object 1130 in different modes. The particular operational modes available to a user and the selections permitted are represented by Icons Nos. 1–18 shown between the viewing window 1120 and the title bar 1100 and 1110. The function and use of the individual icons are discussed more hereinafter. However, they are listed here for convenience:

| Icon No. | Description |
|---|---|
| (1) | EXIT |
| (2) | File Open |
| (3) | Reset Center |
| (4) | Reset Roll |
| (5) | Toggle Stereo |
| (6) | Display Wireframe |
| (7) | Display Face Map |
| (8) | Display Textured Object |
| (9) | Magnify |
| (10) | Reduce |
| (11) | Spin Object |
| (12) | Animate Object |
| (13) | Move Neutral Plane In |
| (14) | Move Neutral Plane Out |
| (15) | Increase Camera Offset |
| (16) | Decrease Camera Offset |
| (17) | About |
| (18) | Help |
| (19) | Display Wireframe and Texture Map |

Figure 12:
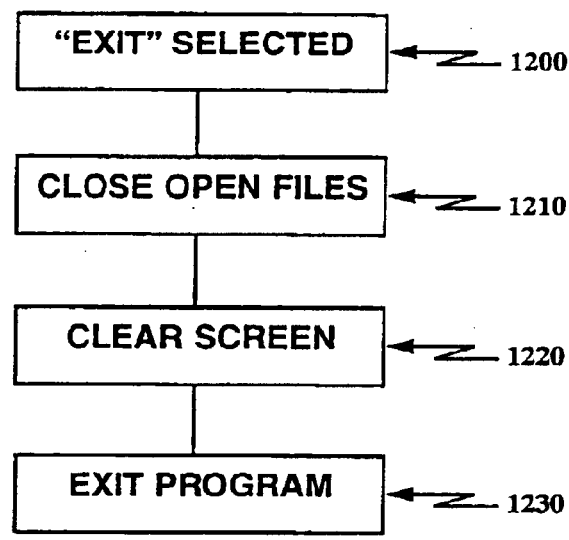
FIG. 12 is a flow chart of an "Exit" function found on the graphical user interface as Icon No. 1.

FIG. 12 is a flow chart of an "Exit" function found on the graphical user interface as Icon No. 1. When the "Exit" icon is selected (1200) all files opened by the .vrx viewer are closed (1210), the screen is cleared (1220) and the program exits (1230).

Figure 13:
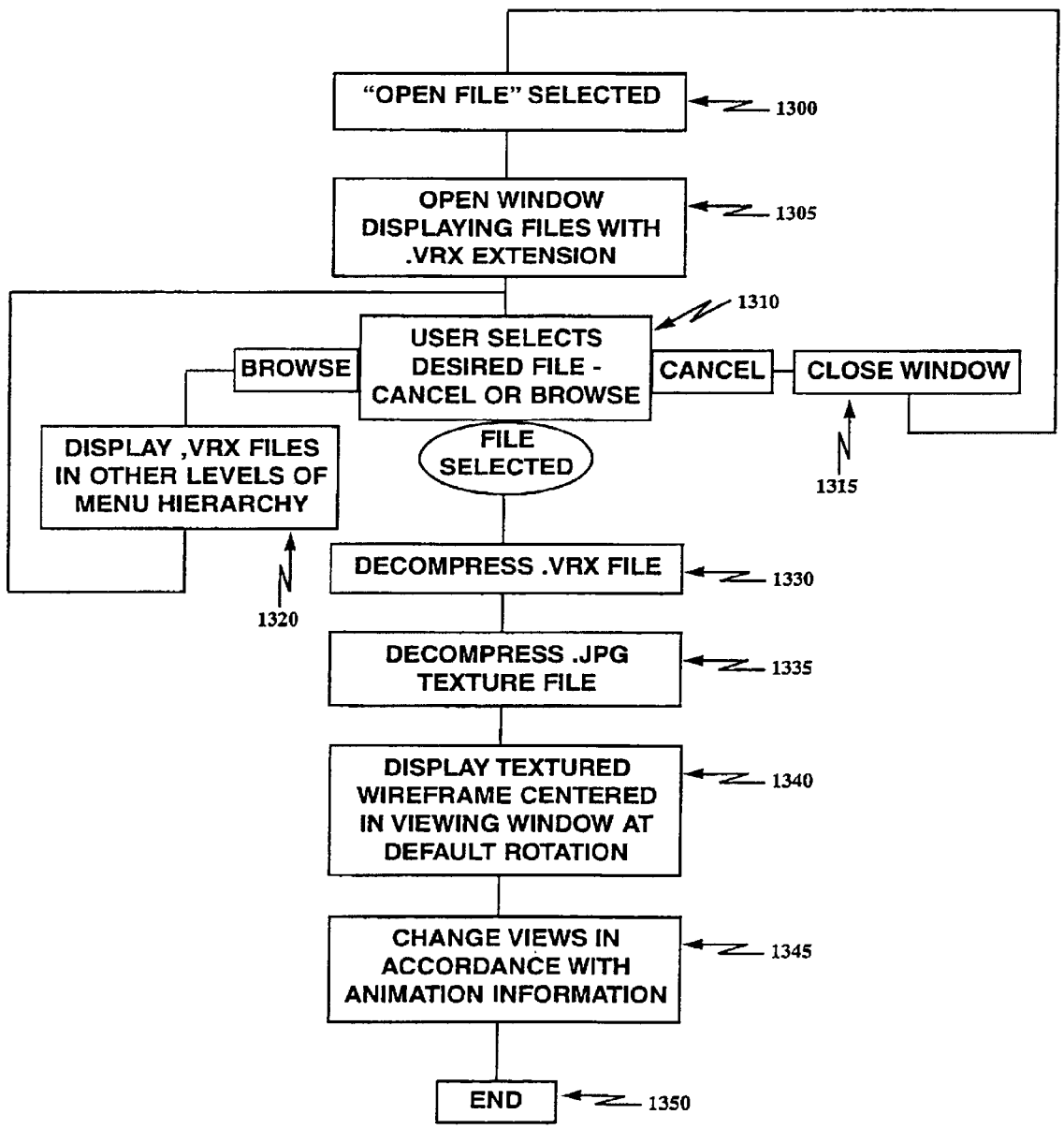
FIG. 13 is a flow chart of an "Open File" process found on the graphical user interface as Icon No. 2.

FIG. 13 is a flow chart of an "Open File" process found in the graphical user interface as Icon No. 2. When "Open File" is selected (1300), a window is opened displaying files with the .vrx extension (1305). The user selects a desired file, "cancel" or "browse." If the use selects "cancel," the window is closed and the process awaits the next "open file" selection. If "browse" is selected, the user may selectively browse other levels of the menu hierarchy to find .vrx files which might be displayed and used with the invention. If the user selects a file (1310—files selected), the .vrx file is decompressed (1330) into its constituent parts. The wire frame information in the .vrx file is then utilized to build a wire frame. The .jpg portion of the .vrx file retains the JPEG compression; however, it needs to be decompressed for use in displaying the raw image information (1335). The texture information from the .jpg file is applied to the surface elements of the wire frame to result in display of a textured wire frame which is centered in the viewing window and positioned at the default rotation (1340). The position and orientation of the wireframe and/or the view of the wireframe (camera position and/or orientation) can be changed in a series of steps in accordance with animation information (1345). The process then ends (1350).

Figure 14:
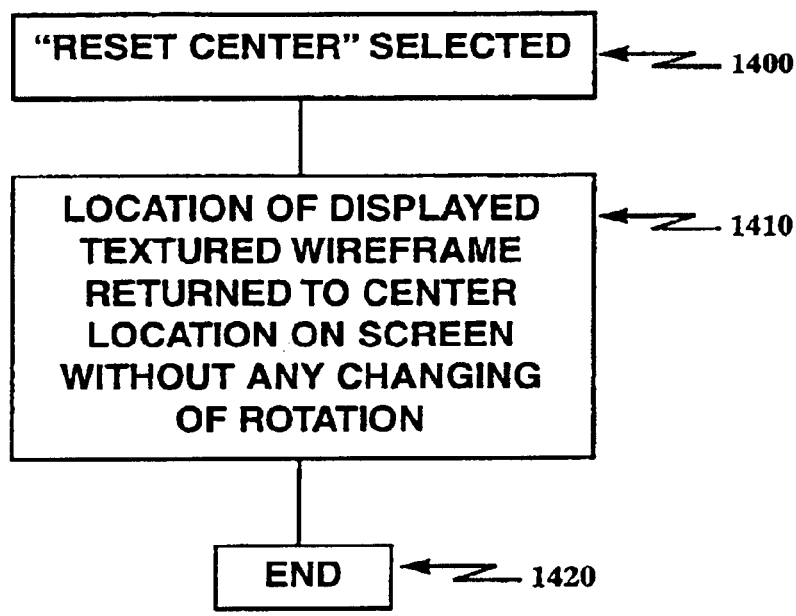
FIG. 14 is a flow chart of a "Reset Center" process found on the graphical user interface as Icon No. 3.

FIG. 14 is a flow chart of a "Reset Center" process found on the graphical user interface as Icon No. 3. When the "Reset Center" process is selected (1400), the displayed textured wire frame is returned to a center position on the screen without changing its rotation (1410), and the process ends.

Figure 15:
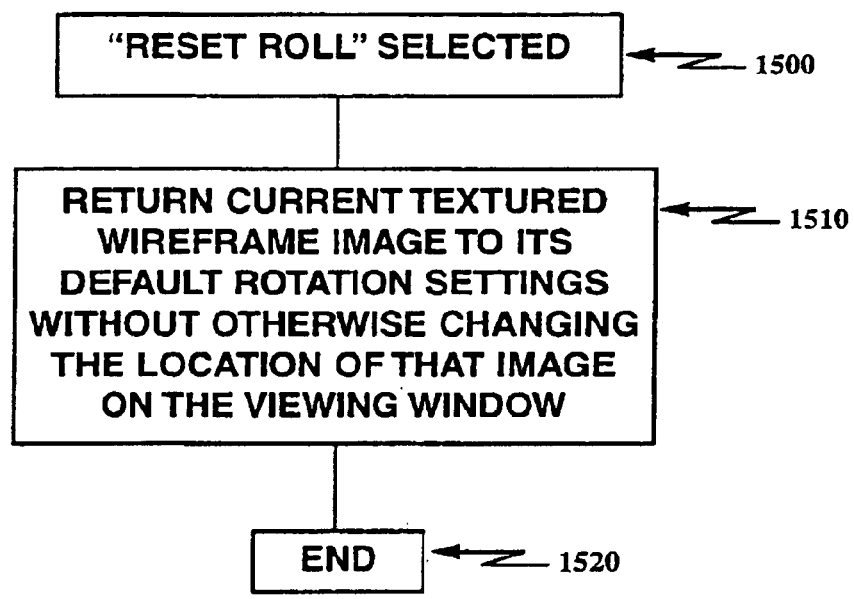
FIG. 15 is a flow chart of a "Reset Roll" process found on the graphical user interface as Icon No. 4.

FIG. 15 is a flow chart of a "Reset Roll" process found on the graphical user interface as Icon No. 4. When "Reset Roll" process is selected (1500), the wire frame image is returned to its default rotation setting without otherwise changing the location of that image on the viewing window (1510), and the process ends (1520).

Figure 16:
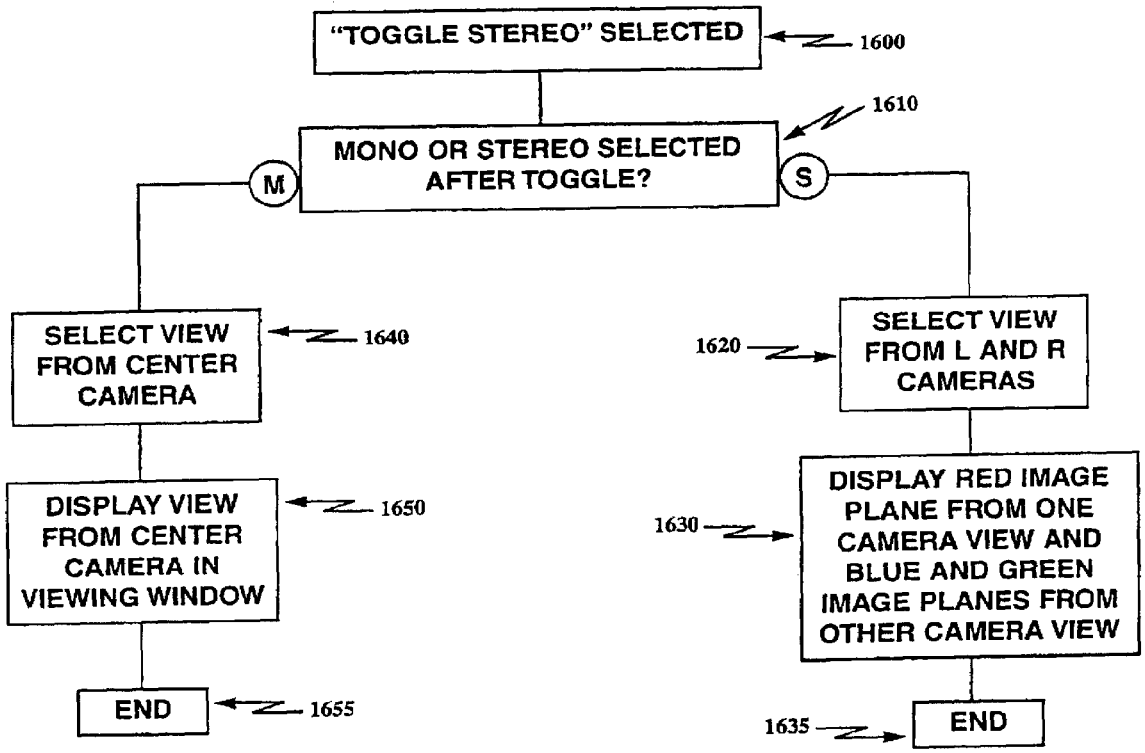
FIG. 16 is a flow chart of a "Toggle Stereo" process found on the graphical user interface as Icon No. 5.

FIG. 16 is a flow chart of a "Toggle Stereo" process found on the graphical user interface as Icon No. 5. By pressing the "Toggle Stereo" button one time, it changes from whatever mode it was in (mono or stereo) to the other mode. If mono is the mode selected after the toggle (1610-M), the view of the center camera described in FIG. 11 is utilized to capture image information. The view from the center camera is then displayed in the viewing window (1650), and the process ends. However, if the stereo mode in effect after the toggle (1610-S), image information from both the L and R camera (1020 and 1030, respectively) are utilized to form a stereo image. For example, the stereo image is preferably constructed by utilizing the red image plane from one camera view and the blue and green image planes from the other camera view and forming them into an R, G, B composite which can be viewed through traditional colored stereo glasses (1630).

Figure 17:
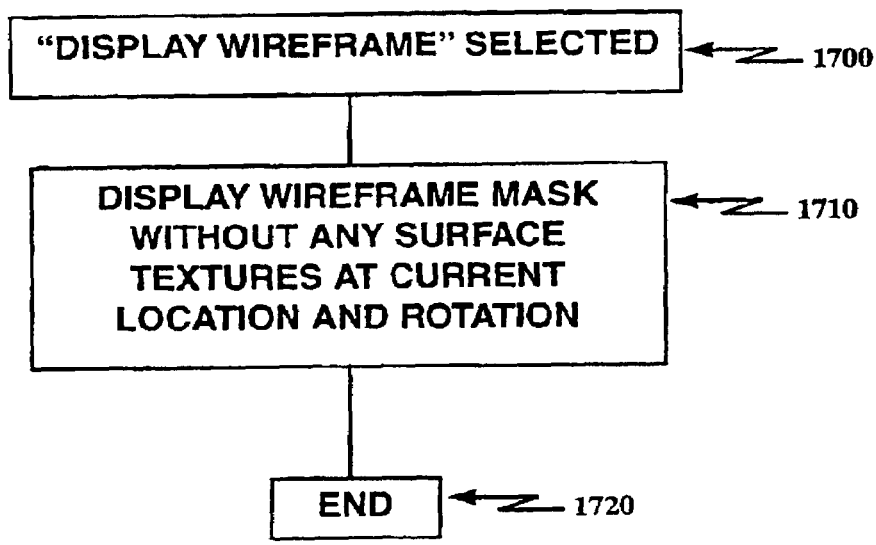
FIG. 17 is a flow chart of a "Display Wire Frame" process found on the graphical user interface as Icon No. 6.

FIG. 17 is a flow chart of a "Display Wire Frame" process found on the Graphical User Interface as Icon No. 6. When "Display Wire Frame" process is selected (1700), a wire frame mesh without any surface texture is displayed at a default location and rotation (1710) and the process ends.

Figure 18:
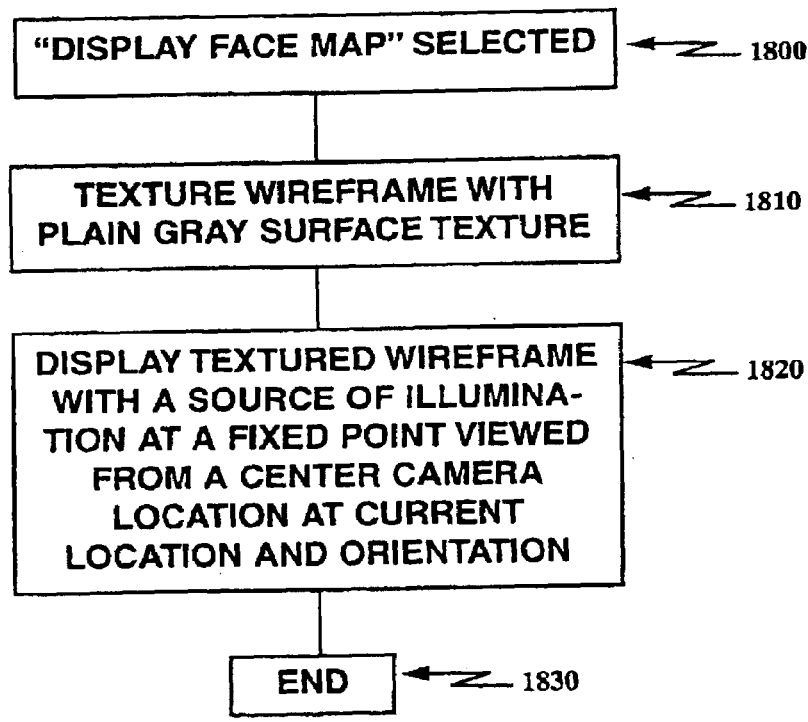
FIG. 18 is a flow chart of a "Display Face Map" process found on the graphical user interface as Icon No. 7.

FIG. 18 is a flow chart of a "Display Face Map" process found on the graphical user interface as Icon No. 7 (1800). The wire frame can be displayed as discussed in the preceding flow chart. In the "Display Face Map" mode, the wire frame is textured with a surface texture (e.g., plain grey) (1810), and the textured wire frame is illuminated with a source of illumination at a fixed point viewed from a center camera location. The textured wire frame is viewed at its current location and orientation (rotation). If the wire frame were not illuminated with a light source, all grey texture would appear equivalent and indistinguishable. Thus, one would not be able to see the texture boundaries very well.

Figure 19:
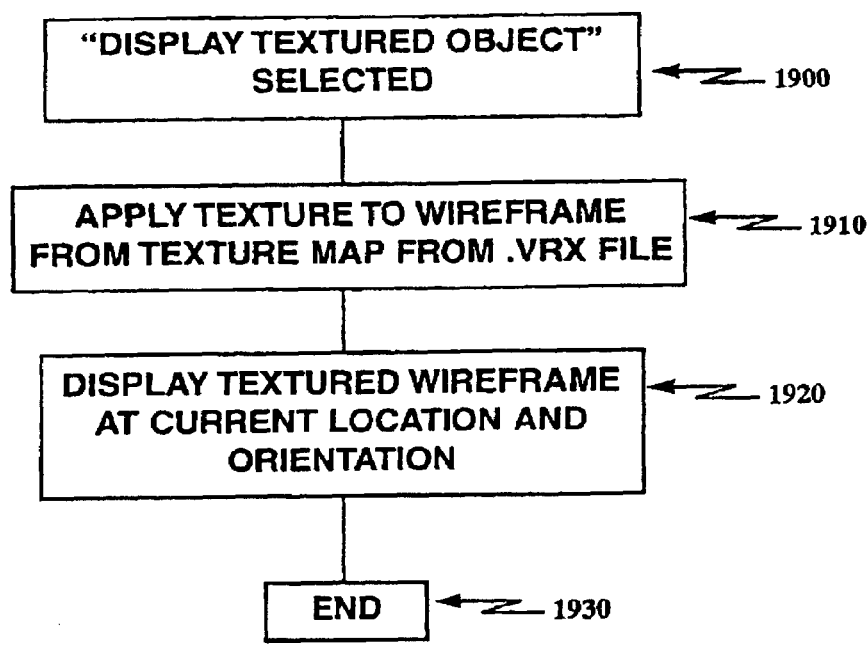
FIG. 19 is a flow chart of a "Display Textured Object" process found on the graphical user interface as Icon No. 8.

FIG. 19 is a flow chart of a "Display Textured Object" process found on the Graphical User Interface on Icon No. 8. When "Display Textured Object" is selected (1900), texture is applied to the wire frame from the texture map from the .vrx file (1910). The textured wire frame is displayed at its default location and orientation (1920), and the process ends.

Thus, Icons 6, 7, 8 and 19 describe four different image modes. In the first, only the wire frame is displayed. It had no texturing. In the second, a very plain texture is applied to the wire frame. In the third bit map information from the .vrx file is utilized to apply texture for the wire frame and in the fourth, both the wireframe and the textured object are displayed.

When captured using Wire Frame Express, the vertex information for the wire frame contains many fewer vertices than would be otherwise required if a wire frame were created, for example, using a Cyberware scanner known from the prior art. In Wire Frame Express, large areas can be circumscribed by points forming a closed polygon around a loop. With such surface elements defined, the texture bit map can be applied directly to the area circumscribed by the polygon. Certain types of wire frame handling products are incapable of handling polygons, but require instead triangles. If that is the case, the area bounded by the polygon can be partitioned into triangular subelements and texture applied to the individual subelements accordingly. The file output from Wire Frame Express includes, the X, Y, Z, and X'Y' locations points discussed in connection with FIGS. 8 and 9.

Each vertex is associated with a pair of coordinates U and V which represent the relative position of that vertex in the bit mapped image utilized to apply texture. For example, if the raw pixel data derived from decompressing at both the .vrx and .jpg level into raw pixel data, contained 1,000 pixels in a horizontal direction and 1,000 pixels in a vertical direction for display, a pixel located at point 100,100 would be identified by UV coordinates as U=0.1 and V=0.1. The 0.1 represents on a scale, typically from zero to one, the percentage of displacement in the X direction or the percentage of displacement in the Y direction where the bit map texture information for that vertex begins. Thus, when texturing a wire frame, the U,V information contained in the Wire Frame Express file format is passed to the rendering engine so that it will know exactly where to begin placing texture information on a particular face of the surface bounded by vertices.

Figure 20:
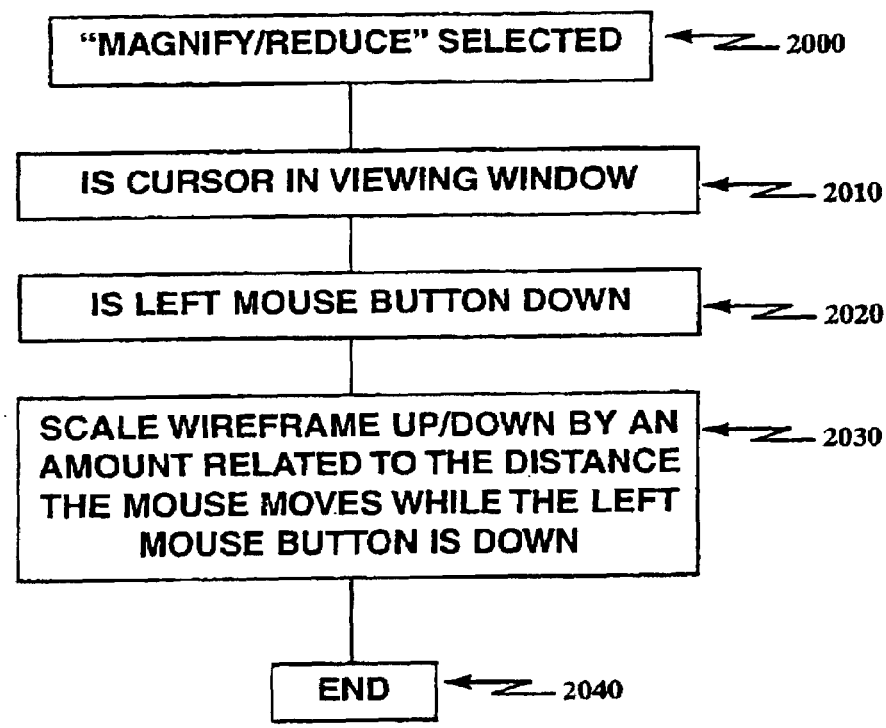
FIG. 20 is a flow chart of a "Magnify"/"Reduce" processes found on the graphical user interface as Icons Nos. 9 and 10, respectively.

FIG. 20 is a flow chart of processes designed to "Magnify" and "Reduce" the selected object. These correspond to Icons 9 and 10 of the Graphical User Interface. When "Magnify" or "Reduce" is selected (2000), if the cursor is in the viewing window (2010) and if the left mouse button is held down (2020), the wire frame representation of the real world object is scaled up (down) by an amount related to the distance the mouse moves while the left mouse button is held down (2030), and the process ends.

Figure 21:
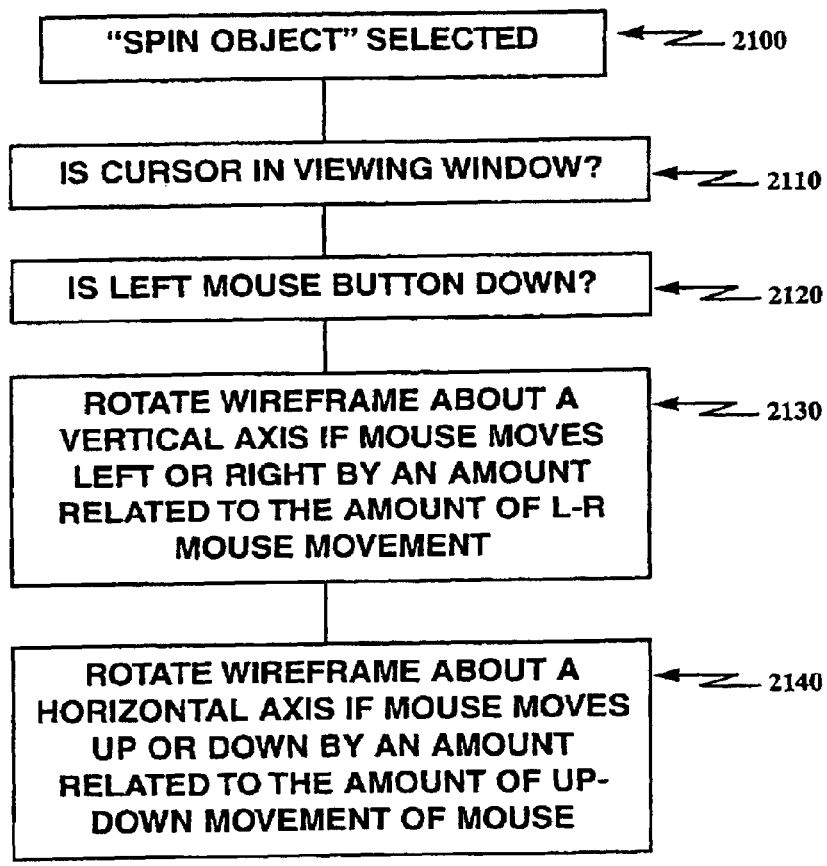
FIG. 21 is a flow chart of a "Spin Object" process found on the graphical user interface as Icon No. 11.

FIG. 21 is an illustration of a "Spin Object" process found on the graphical user interface as Icon No. 11. When "Spin Object" is selected (2100), a determination is made whether the cursor is in the viewing window (2110) and whether the left mouse button is down (2120). If both conditions are true, the wire frame is rotated about a vertical axis if the mouse moves left or right by an amount related to the sum of L-R mouse movements (2130). However, the wire frame is rotated about a horizontal axis, if the mouse moves up or down, by an amount related to the sum of up-down movements of the mouse (2140).

Figure 22:
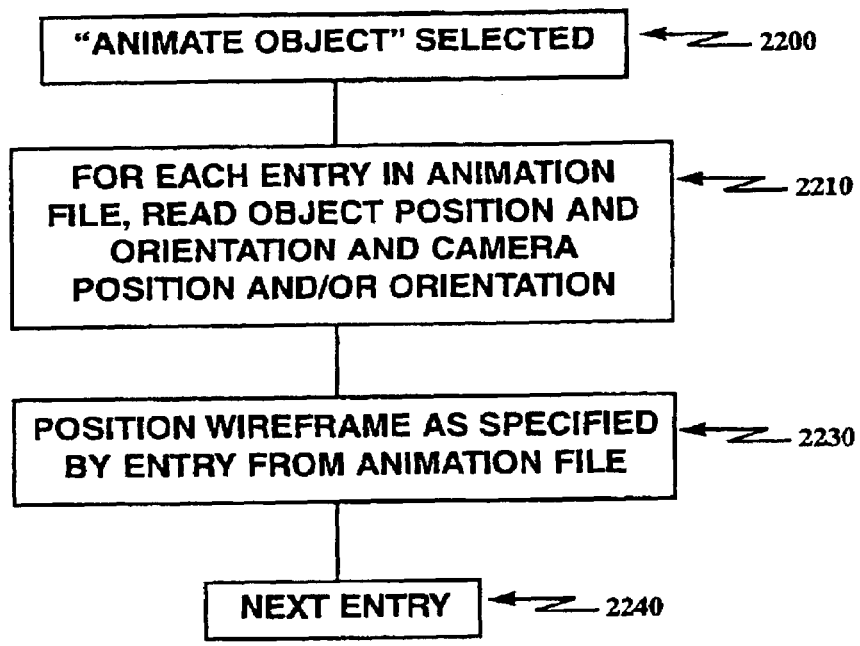
FIG. 22 is a flow chart of a "Animate Object" process found on the graphical user interface as Icon No. 12.

FIG. 22 is a flow chart of an "Animate Object" process found on the graphical interface as Icon No. 12. When "Animate Object" is selected (2200), for each entry in the animation file, the object position and orientation and the corresponding camera(s) position and orientation are read and used to position the wireframe and its view as specified by the entry from the animation information or file.

Figure 23:
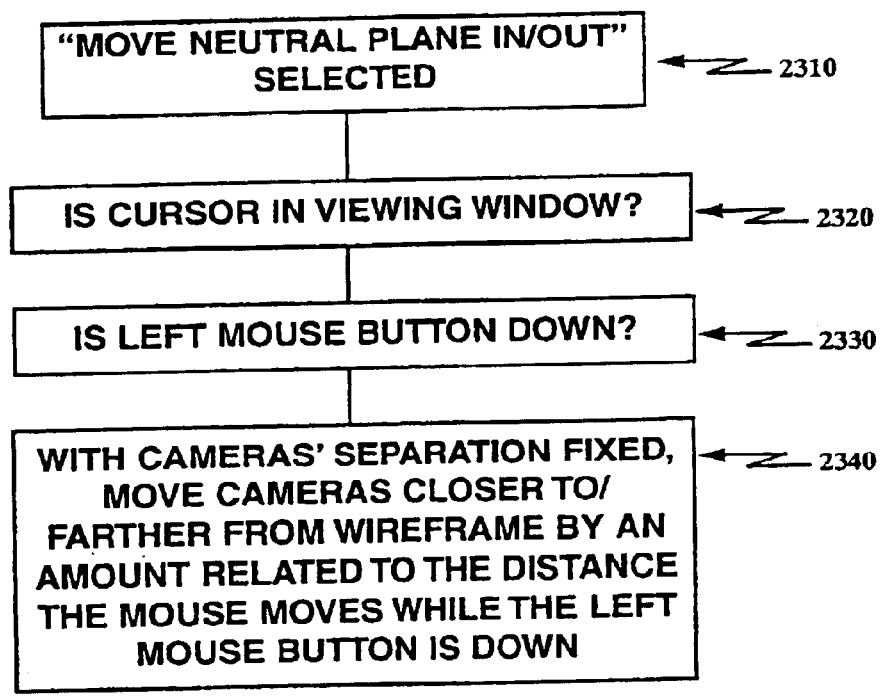
FIG. 23 is a flow chart "Move Neutral Plane In"/"Move Neutral Plane Out" processes found on the graphical user interface as Icons Nos. 13 and 14, respectively.

FIG. 23 is a flow chart of "Move Neutral Plane In" and "Move Neutral Plane Out" processes found on the graphical user interface as Icons Nos. 13 and 14. If the cursor is in the viewing window (2320) and if the left mouse button is down (2330), with the cameras' separation fixed, the cameras are moved closer to/farther from the wire frame by an amount related to the distance the mouse moves while the left mouse button is down (2340).

Figure 24:
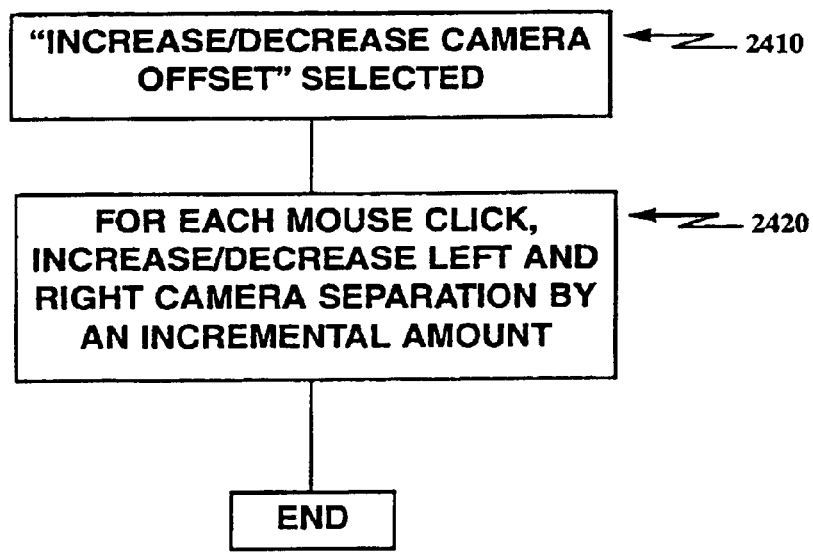
FIG. 24 is a representation of "Increase Camera Offset"/"Decrease Camera Offset" processes found on the graphical user interface as Icons Nos. 15 and 16, respectively.

FIG. 24 is a flow chart of "Increase Camera Offset"/ "Decrease Camera Offset" processes found on the graphical user interface as Icons Nos. 15 and 16. When "Increase"/ "Decrease Camera Offset" is selected (2410), for each left mouse click, the left and right camera separation is increase/ decreased by an incremented amount. Thus, by repeated application of the mouse click a relatively arbitrary amount of camera separation can be achieved.

Figure 25:
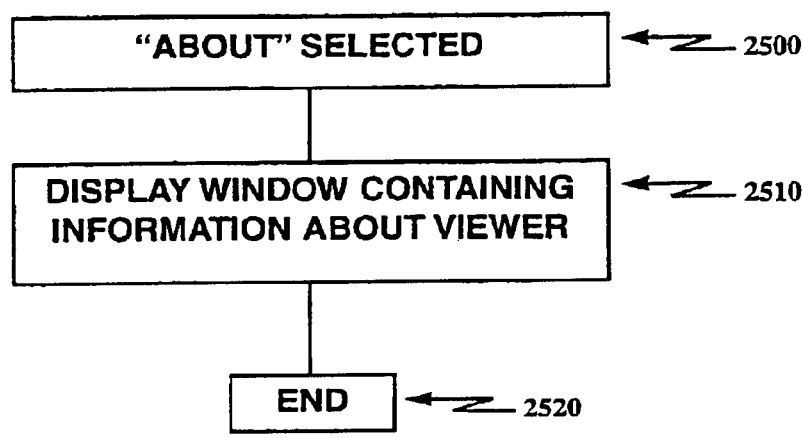
FIG. 25 is a flow chart of an "About" process found on the graphical user interface as Icon No. 17.

FIG. 25 is a flow chart of an "About" process found on the graphical user interface as Icon No. 17. When "About" is selected (2500), a display window is opened and information is displayed in that display window about the viewer and the company manufacturing the viewer (2510). Other information may also be provided selectively to a user.

Figure 26:
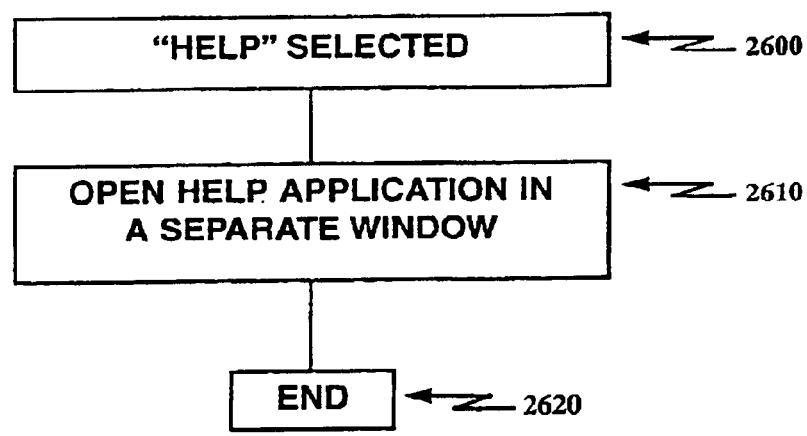
FIG. 26 is a flow chart of a "Help" process found on the graphical user interface as icon No. 18.

FIG. 26 is a flow chart of a "Help" process found on the graphical user interface as Icon No. 18. When "Help" is selected (2600), a help application is opened (2610) in a separate window and may be navigated and utilized by a user to obtain the desired help information. Typically, the help application includes search functionality as well as pagination and printing functionality.

Figure 27:
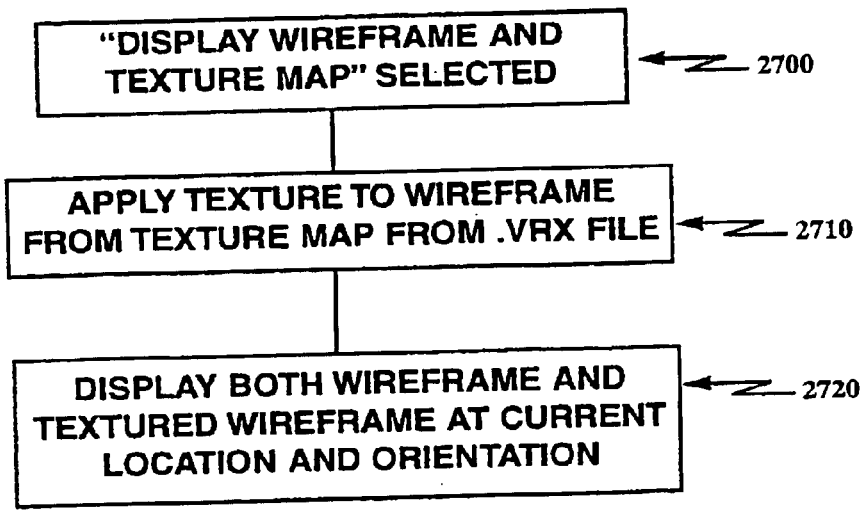
FIG. 27 is a flow chart of a "Display Wireframe and Texture Map" process found on the graphical user interface located as icon No. 19 or located between icons 7 and 8.

FIG. 27 is a flow chart of a "Display Wireframe and Texture Map" process found on the graphical user interface as icon No. 19 or located between icons 7 and 8. When "Display Wireframe and Texture Map" is selected (1900), texture is applied to the wire frame from the texture map from the .vrx file (1910). The textured wire frame is displayed at its default location and orientation (1920), and the process ends. In addition, the wireframe is also made visible. This allows the developer of a model to more easily detect the location of "missing face" elements and also allows the viewer to see something in the viewing window in case the model has texture maps only on the "back side" of the model as sometimes occurs when the model is essentially a sculpted, almost flat object like a picture frame.

In the preceding, a graphical user interface has been described which overcome the problems of the prior art and permits the rapid, efficient and cost effective display of three dimensional stereo information to the user.

There has been shown and described only the preferred embodiment of the invention, but, as aforementioned, it is to be understood that the invention is capable of use in various other combinations and environments. It is capable of changes or modifications within the scope of the invention concept as expressed herein.

What is claimed is:

1. A method of storing wireframe information for presentation as a stereo image, comprising the step of:
   a. storing x,y,z coordinates of vertices of a wireframe together with u,v coordinates specifying a corresponding location in a bit map containing texturing information used in rendering said stereo image.

2. The method of claim 1, comprising the additional step of storing said bitmap in a compressed form with said x,y,z and u,v coordinates.

3. The method of claim 2 further comprising the step of compressing said bitmap in a compressed form and said x,y,z and u,v coordinates into a single file.

4. A method of displaying wireframe information stored in a file, comprising the steps of:
   a. extracting wireframe vertex information and a compressed bit map from said file,
   b. decompressing said compressed bitmap, and
   c. displaying a wireframe specified by said wireframe information, with texture taken from said bitmap.

5. A computer program product, comprising:
   a. a memory medium, and
   b. a computer program stored on said memory medium, said computer program containing instructions for storing x,y,z coordinates of vertices of a wireframe together with u,v coordinates specifying a corresponding location in a bit map containing texturing information.

6. A computer program product, comprising:
   a. a memory medium, and
   b. computer controlling information stored on said memory medium, said computer controlling information including vertex location information for a plurality of vertices, a bit map of texture for faces of a wireframe and a set of u;v coordinates for each vertex pointing to a corresponding location on said bit map.

* * * * *

UNITED STATES PATENT AND TRADEMARK OFFICE
CERTIFICATE OF CORRECTION

PATENT NO.       : 7,190,371 B2
APPLICATION NO.  : 10/839314
DATED            : March 13, 2007
INVENTOR(S)      : Palm et al.

Page 1 of 3

It is certified that error appears in the above-identified patent and that said Letters Patent is hereby corrected as shown below:

On the Title Page, in Item (62), under "Related U.S. Application Data", in Column 1, Line 2, delete "7,038,698." and insert -- 7,038,698, which is a 371 of PCT/US97/02035, filed on Feb. 7, 1997, which claims benefit of 60/011,356, filed on Feb. 8, 1996. --, therefor.

On the Title Page, insert Item -- (30) Foreign Application Priority Data
Feb. 7, 1997    (JP)    9-530197
Feb. 7, 1997    (EP)    97914758.4 --.

In the Drawings:

In Fig. 7, Sheet 6 of 25, delete " 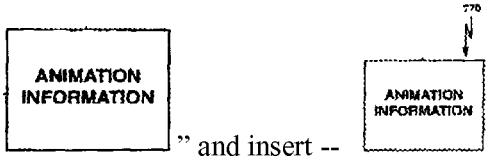 " and insert --  --, therefor.

In Fig. 11, Sheet 10 of 25, delete "VRX" and insert -- .VRX --, therefor.

In Fig. 13, Sheet 12 of 25, for Tag "1320", in Line 1, delete ",VRX" and insert -- .VRX --, therefor.

In the Specifications:

In Column 1, Line 12, delete "1996" and insert -- 1996 and PCT/US97/02035 filed on Feb. 7, 1997, --, therefor.

In Column 1, Line 55, delete "cameras" and insert -- cameras. --, therefor.

Signed and Sealed this
Twentieth Day of August, 2013

Teresa Stanek Rea
*Acting Director of the United States Patent and Trademark Office*

CERTIFICATE OF CORRECTION (continued)

U.S. Pat. No. 7,190,371 B2

In Column 3, Line 32, delete "dimension" and insert -- dimensional --, therefor.

In Column 4, Line 17, delete "bitmap" and insert -- bitmap. --, therefor.

In Column 5, Line 20, delete "Icons Nos." and insert -- Icon Nos. --, therefor.

In Column 5, Line 24, delete "a "Animate" and insert -- an "Animate --, therefor.

In Column 5, Line 26, delete "flow chart" and insert -- flow chart of a --, therefor.

In Column 5, Line 28, delete "Icons Nos." and insert -- Icon Nos. --, therefor.

In Column 5, Line 31, delete "Icons Nos." and insert -- Icon Nos. --, therefor.

In Column 5, Line 35, delete "icon" and insert -- Icon --, therefor.

In Column 5, Line 38, delete "icon" and insert -- Icon --, therefor.

In Column 5, Line 38, delete "icons" and insert -- Icon Nos. --, therefor.

In Column 5, Line 64, delete "Theses" and insert -- These --, therefor.

In Column 8, Line 10, delete "the" and insert -- The --, therefor.

In Column 8, Line 46, delete "if" and insert -- of --, therefor.

In Column 8, Line 53, delete "(1110)." and insert -- (1010). --, therefor.

In Column 8, Lines 54-55, delete "1110, cameras 1120 and 1130" and insert -- 1010, cameras 1020 and 1030 --, therefor.

In Column 8, Line 67, delete "Icons Nos." and insert -- Icon Nos. --, therefor.

In Column 9, Line 34, delete "use" and insert -- user --, therefor.

In Column 10, Line 39, delete "Icons" and insert -- Icon Nos. --, therefor.

In Column 11, Line 14, delete "Icons" and insert -- Icon Nos. --, therefor.

In Column 11, Line 41, delete "Icons" and insert -- Icon --, therefor.

In Column 11, Line 49, delete "Icons" and insert -- Icon --, therefor.

In Column 11, Line 51, delete "increase/" and insert -- increased/ --, therefor.

CERTIFICATE OF CORRECTION (continued)
U.S. Pat. No. 7,190,371 B2

In Column 12, Line 6, delete "icon" and insert -- Icon --, therefor.

In Column 12, Line 6, delete "icons" and insert -- Icon Nos. --, therefor.